United States Patent [19]
Olschewski et al.

[11] 4,436,516
[45] Mar. 13, 1984

[54] CYLINDRICAL ROLLER BEARING SUPPORT FOR TRUNNIONS IN FORK EYES OF UNIVERSAL JOINTS

[75] Inventors: Armin Olschewski, Schweinfurt; Manfred Brandenstein, Eussenheim; Heinrich Kunkel, Schweinfurt, all of Fed. Rep. of Germany

[73] Assignee: SKF Kugellagerfabriken GmbH, Schweinfurt, Fed. Rep. of Germany

[21] Appl. No.: 284,191

[22] Filed: Jul. 17, 1981

[30] Foreign Application Priority Data

Jul. 18, 1980 [DE] Fed. Rep. of Germany ....... 3027263

[51] Int. Cl.³ .............................................. F16D 3/41
[52] U.S. Cl. ................................. 464/128; 308/207 R; 308/216; 464/132
[58] Field of Search ................. 464/14, 128, 129, 130, 464/132; 308/35, 163, 207 R, 210, 216, DIG. 3; 384/126, 425

[56] References Cited

U.S. PATENT DOCUMENTS

| 3,050,351 | 8/1962 | Kempf | 308/163 X |
|---|---|---|---|
| 3,353,374 | 11/1967 | Buthenloff | 464/128 X |
| 3,611,751 | 10/1971 | Kleinschmidt | 464/14 |
| 3,937,035 | 2/1976 | Fisher et al. | 464/130 |
| 4,130,325 | 12/1978 | Schultenkämper | 384/425 |
| 4,144,724 | 3/1979 | Armasow et al. | 464/128 |

FOREIGN PATENT DOCUMENTS

| 2625960 | 11/1977 | Fed. Rep. of Germany | 464/132 |
|---|---|---|---|
| 1156044 | 5/1958 | France | 308/207 R |
| 878997 | 10/1961 | United Kingdom | 464/132 |

*Primary Examiner*—Stuart S. Levy
*Assistant Examiner*—Daniel P. Stodola
*Attorney, Agent, or Firm*—Eugene E. Renz, Jr.

[57] ABSTRACT

Support means for trunnions in fork eyes of universal joints comprising a bearing bushing consisting of a generally cylindrical sleeve section and a bottom section closing one axial end of the sleeve section adapted to axially support the trunnion and a plurality of cylindrical rollers arranged in at least two side by side rows. The rollers engage and roll between outer races in the bore of the sleeve section and inner races on the trunnion. The sleeve section has a constant uniform diameter over its entire outer peripheral surface and has outer races formed in its bore section which are offset in steps radially inward towards the bottom section. The inner races are disposed in side by side array on the trunnion and of the same diameter without offset.

8 Claims, 3 Drawing Figures

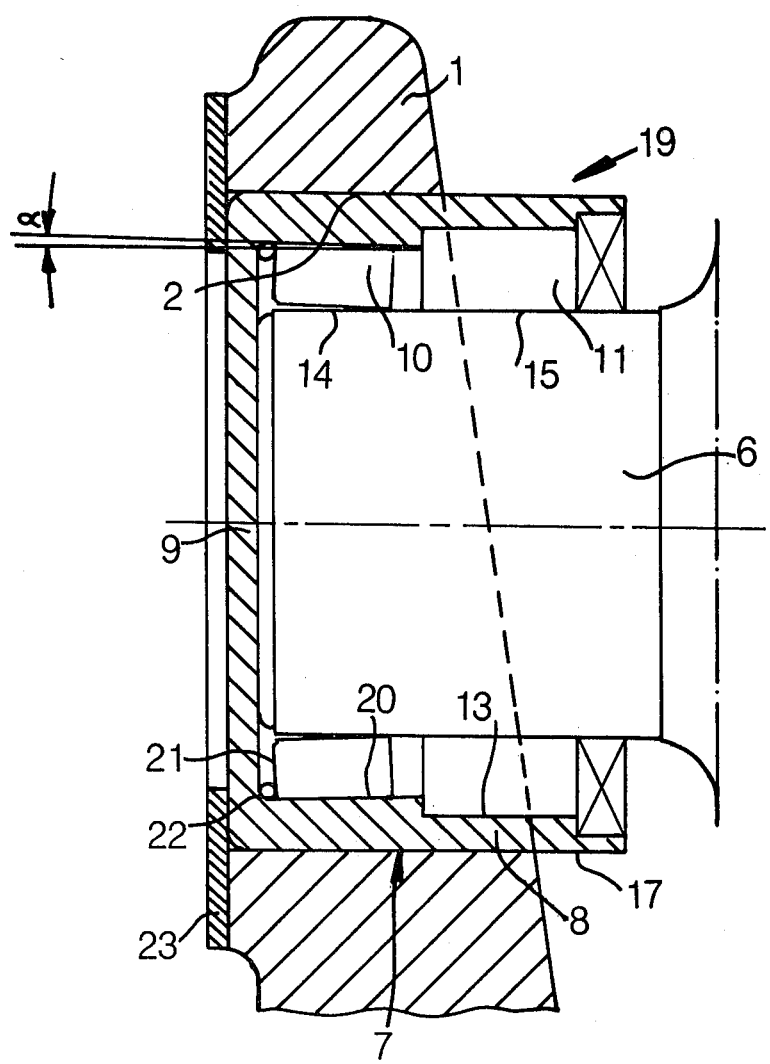

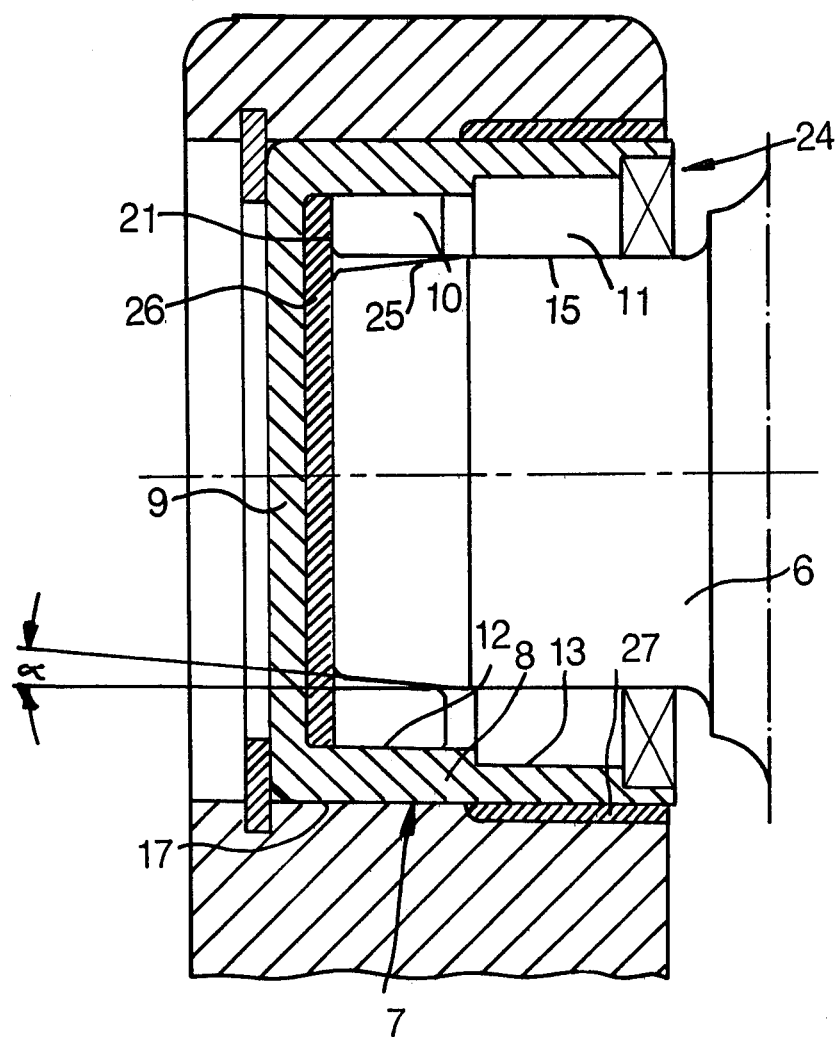

CYLINDRICAL ROLLER BEARING SUPPORT FOR TRUNNIONS IN FORK EYES OF UNIVERSAL JOINTS

BACKGROUND AND SUMMARY OF THE INVENTION

The present invention relates to a trunnion support in fork eyes of universal joints. More specifically, the support consists of a cylindrical roller bearing with a bearing bushing consisting of a sleeve section and a bottom section axially supporting the trunnion and which closes the sleeve section on one side and at least two rows of cylindrical rollers arranged side by side which engage and roll between outer races in the bore of the sleeve section and inner races on the trunnion.

Supports of this general type are not new, per se. In the state of the art supports, typically the outside surface of the sleeve section of the bearing bushing is constructed so that it corresponds to the outer races of the bore of the sleeve section whereby the outside surface as well as the bore of the sleeve section are either cylindrically smooth or stepped as illustrated in German preliminary application No. 2,625,960. In the assembly illustrated in the German application, the trunnion is tapered in steps toward its end in order to form inner races for the cylindrical rollers which are arranged next to one another. This type of prior art support has several disadvantages and drawbacks. For example, it has been found that the end of the trunnion experiences high bending stresses by reason of the fact that it is of relatively small diameter and also due to the high notch stress produced at the step or juncture between the inner races of the trunnion. These combined stresses produce material fatigue and failure of the trunnion. Furthermore, a trunnion with stepped or offset inner races is rather difficult and uneconomical to manufacture.

Additionally, the bearing sleeve of this known type of support usually has a uniformly thick wall between the thick walled sleeve section of the bearing bushing and the trunnion to accommodate the cylindrical rollers. By reason of this, the cylindrical roller bearing has a relatively small bearing capacity and the only way of increasing the bearing capacity is by enlarging the width of the cylindrical roller bearing and providing additional rows of cylindrical rollers or utilizing long rollers, such as needle rollers. This alternative, however, results in an increased support width and an enlarged diameter of the universal joint which is not desirable. The width of the support cannot be arbitrarily increased since the trunnion of the cross piece of the universal joint must then be constructed with much more of a taper and thereby weakened so that the cross piece can be fitted through the fork eyes of the fork joints.

In accordance with another known prior art support, the cylindrical roller bearing consists of a row of long needle rollers wherein the inner race on the trunnion or the outer race in the bore of the sleeve is slightly tapered. This arrangement is shown in German Patent No. 1,122,781. The roller bearing, however, comprises only a single row of cylindrical rollers. The wall thickness of the sleeve and bottom section of the bearing bushing must therefore be rather thick in cross section so that axial forces produced by the trunnion on the bottom section can be transmitted without harmful buckling of the bearing bushing to the fork joint. Here again, there is a rather small radial space between the trunnion and the bearing bushing and only thin cylindrical rollers, such as needle rollers, can be installed which do not have an efficient bearing capacity in many applications and/or occupy too large an axial construction width.

With the foregoing in mind, it is an object of the present invention to provide a support for trunnions in fork eyes of universal joints by means of a cylindrical roller bearing which is characterized by novel features of construction and arrangement providing high bearing capacity and nevertheless, is of relatively compact and small construction width. The support of the present invention is also of simplified design and is rather economical to manufacture. To this end, the sleeve section of the bearing bushing has a constant diameter over the entire width of the outer surface and has outer races in its bore which are offset or stepped radially inwardly toward the bottom section and wherein the inner races are arranged side by side on the trunnion are of the same diameter without any offset or step. By this construction, the trunnion of the cross piece of the universal joint can be manufactured economically since offsets or steps do not have to be incorporated in the trunnion. Elimination of notched recesses in the trunnion produces a construction that has a high bending strength. Furthermore, by this construction, the bearing bushing adjacent its bottom section is very rigid since the bottom section can be constructed with thick walls and forms a transition at its outer edge to a relatively thick walled part of the sleeve section. Thus, high axial forces can be transmitted from the front face of the trunnion to the bottom section without resulting in a harmful buckling of the bearing bushing.

In accordance with the present invention, the sleeve section is open on the side axially opposite the bottom section and the outer races formed therein are of a relatively large diameter so that the wall thickness is extremely small in the order of only several millimeters. Correspondingly, the space between the trunnion and the sleeve section is optimally utilized in this area for accommodating large diameter cylindrical rollers with a high bearing capacity without impairing the buckling rigidity of the bearing bushing. The construction width of the cylindrical roller bearing can therefore be kept very small as a result of its high radial bearing capacity which is particularly advantageous in terms of installing the cylindrical roller bearing and in positioning the cross piece in the fork joints of the universal joint.

In accordance with another feature of the present invention, the sleeve section is supported non-elastically at its outer peripheral surface on the side of the bottom section over its entire periphery and is supported somewhat elastically at its side opposite the bottom section at least in a radial load direction of the fork eye. In this manner, there is provided a support which can accept angular deviation of the trunnion in relation to the bearing bushing without damage since the thin wall part of the sleeve section of the bearing is elastic in the radial direction and this radial load is uniformly distributed to the individual rows of cylindrical rollers in the cylindrical roller bearing when angular deviation, for example, misalignment of the axis of the trunnion occurs. Such angular deviation of the trunnion is produced in the universal joint, for example, during transmission of high moments of rotation and also as a result of mutual elastic displacement of the fork leg carrying the fork eyes of each joint.

In accordance with a further feature of the present invention, the inner races of the rows of the cylindrical rollers arranged nearest the bottom section of the bearing bushing are conical and taper slightly in a radially inwardly direction towards the bottom section. By this configuration, deleterious end pressures between the rows of cylindrical rollers arranged near the bottom section of the bearing bushing and their races do not occur when the trunnion is displaced in relation to the bearing bushing. Furthermore, these rows of cylindrical rollers run on a relatively thick walled sleeve section near the rigidifying bottom section. Thus at small loads and low moments of rotation of the universal joint, only the end of the cylindrical rollers facing away from the bottom section are bearing. Conversely with a high load, the fork legs of each fork joint are mutually displaced in the manner described above. The cylindrical rollers then bear uniformly over their entire roller length since the inner race of the cylindrical rollers of the trunnion and/or the outer race of the cylindrical rollers or of the sleeve section are slightly conically tapered corresponding to the amount of angular deviation of the trunnion.

The arrangement of the rows of cylindrical rollers installed on the side axially opposite the bottom section, that is at the open end of the bearing bushing in the sleeve section is different. At this location, the sleeve section is of a thin walled construction and is supported partly elastically in the fork eye of the fork joint at least in the direction of the radial load. Accordingly with an angular deviation of the trunnion, this load will be at least partly transmitted by the loaded cylindrical rollers to the elastic thin walled part of the sleeve section so that the cylindrical rollers obtain a relatively uniform load distributed over the roller length and to be sure with a high as well as a low moment of rotation at the universal joint. In this manner, the danger of producing end pressure is prevented for the row or rows of cylindrical rollers installed on the open side of the bearing bushing.

In accordance with another feature of the present invention, the bearing bushing may be manufactured in a deep draw and/or pressure shaping process without cutting or finishing operations and this, therefore, provides a very simple means for producing the bearing bushing which is also rather economical.

BRIEF DESCRIPTION OF THE DRAWINGS

These and other objects of the present invention of the various features and details of the construction of a support for trunnions in fork eyes at the universal joints by means of cylindrical roller bearings according to the present invention are hereinafter more fully described in connection with the accompanying drawings, wherein;

FIG. 2 shows a longitudinal sectional view through a modified cylindrical roller bearing installed in the fork leg of the universal joint; and FIG. 3 is a longitudinal sectional view through a further modification of cylindrical roller bearings installed in a fork leg of a universal joint.

DESCRIPTION OF THE PREFERRED EMBODIMENT

Figure 1:
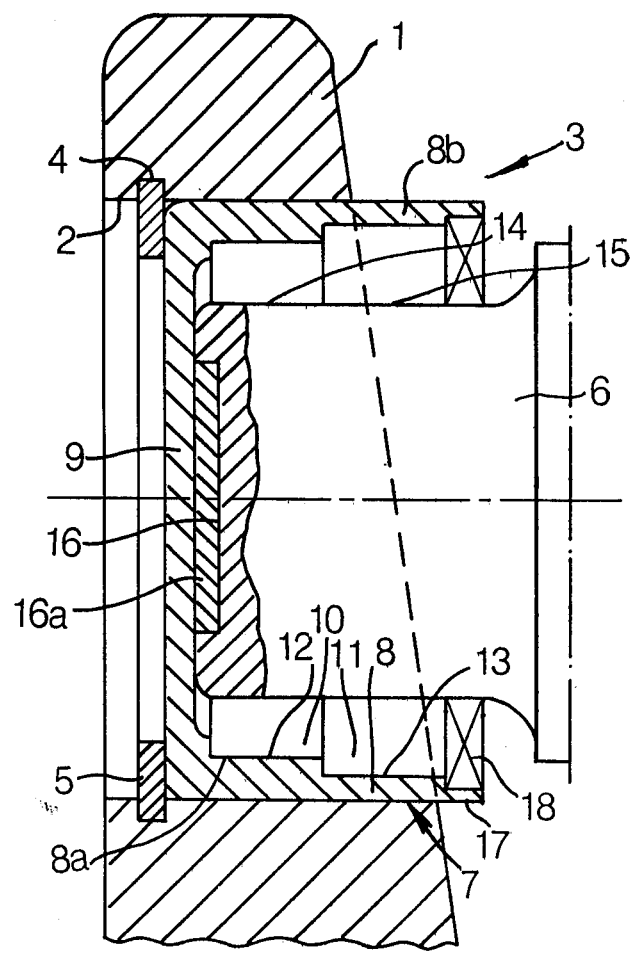
FIG. 1 is a longitudinal sectional view through a cylindrical roller bearing installed in the fork leg of a universal joint.

Referring now to the drawings and particularly to FIG. 1 thereof, there is illustrated a support for a universal joint assembly in accordance with the present invention. The fork leg of the fork joint of the universal joint (not shown) is designated by the numeral 1. A cylindrical roller bearing 3 is mounted in the cylindrical bore of the fork eye 2 and is axially supported on the outer side of the fork joint in the fork leg by a spring ring 5 which snaps in an annular groove or recess 4 of the fork eye 2. The trunnion 6 of a cross piece (not shown) of a standard universal joint is supported in each cylindrical roller bearing 3.

The cylindrical roller bearing 3 comprises a bearing bushing 7 having a generally cylindrical sleeve section 8 and a bottom section 9 which forms an end closure for the sleeve section on one side and two rows of cylindrical rollers 10, 11 arranged in side by side array in the bearing bushing 7. In the present instance, the rows of cylindrical rollers are mounted without a cage and roll at the periphery of the cylindrical roller bearing 3. As illustrated, the rollers of each row engage and run between the cylindrical outer races 12, 13, formed in the bore 8a of the sleeve section 8 and the cylindrical inner race 14, 15 formed on the trunnion 6. A friction bearing disc insert 16a made of an elastic plastic material filled with a lubricant is mounted in a recess in the front face 16 of the trunnion 6 and bears against the flat planar inside face of the bottom section 9 of the bearing bushing 7. The bearing space in the bearing bushing 7 is sealed toward the outside by a seal ring 18 which is assembled in the open end of the bearing bushing and slides on the trunnion 6.

The sleeve section 8 has a constant diameter over the entire width of its outside surface 17 and has the other races 12, 13 formed integrally in the bore thereof which is illustrated offset in steps radially inwardly towards the bottom section 9. In the illustrated embodiment, the diameter of the outer race 13 adjacent the open end of the bearing bushing 7 is greater than the diameter of the outer race 12 adjacent the bottom section 9. Since the cylindrical inner races 14, 15, on the trunnion 6 disposed adjacent one another are of the same diameter without an offset there is a greater bending resistance in the cylindrical trunnion 6. The cylindrical rollers 10 of the row nearest in adjacent the bottom section have a smaller roller diameter than the cylindrical rollers 11 which are assembled in the open side of the bearing bushing 7 axially opposed to the bottom section 9. As illustrated, the wall of the sleeve section 8 is very thin at the location of the outer race 13 for the cylindrical rollers 11 so that the rollers 11 may comprise large diameter rollers which have a high bearing capacity.

While the bearing bushing 7 may be produced by various conventional techniques, it may be manufactured with a high accuracy from metal tape in a deep drawing process without cutting or trimming so that a subsequent metal-removing machining of the bearing bushing 7 for example, optional polishing of the races 12 and 13 can be omitted.

As illustrated, the wall of the bottom section 9 and of the adjoining part of the sleeve section 8 at the location of the outer race 12 are of a predetermined thickness so that harmful buckling of the bearing bushing 7 does not occur when the trunnion 6 transmits axial loads via the bearing bushing 7 to the spring ring 5 in the fork eye 2.

As illustrated in FIG. 1, the sleeve section 8 is completely supported in the fork eye 2 of the fork joint 1 at its outer peripheral surface 17 on the bottom section 9 and on the side opposite the bottom section, sleeve section 8 is only supported over a small width of the fork eye in a radial direction, and load acting perpendicularly to the plane of the drawing in FIG. 1.

In the present invention, the rollers 10 and 11 are of substantially the same axial length as their respective outer races 12 and 13. Note that the cylindrical rollers 11 are longer and therefore more sensitive than the cylindrical rollers 10 and are not subject to dangerous end pressure should the trunnion 6 in the fork eye 2 be misaligned since the thin walled portion 8b of the sleeve section 8 of the bearing bushing 7 which is not supported in the fork eye 2 is radially elastic.

This arrangement compensates for and renders harmless unavoidable small axis misalignments of the trunnion 6 in the fork eyes 2 of the fork joints 1 caused by manufacturing tolerances or elasticity of the universal joint components.

There is illustrated in FIG. 2 a modified cylindrical roller bearing identified by the numeral 19 which is of the same general construction as the cylindrical roller bearing 3 shown in FIG. 1 described above and accordingly, elements of the universal joint assembly are designated by the same numeral as in FIG. 1. Thus the cylindrical roller bearing 19 comprises as in the previously described embodiment a bearing bushing 7 with a sleeve section 8 and a bottom section which closes off the sleeve section at one side and a plurality of cylindrical rollers arranged in side by side rows 10, 11 in the bearing bushing 7. The sleeve section 8 also has a constant diameter over its entire length at its outer periphery 17 and the outer races 13 and 20 formed in the bore of the sleeve section are offset or stepped radially inwardly towards the bottom section 9. The inner races 14 and 15 are of the same diameter and are arranged in side by side array on the trunnion 6 without offsets or steps.

In the present invention, the outer race 20 of the sleeve section 8 nearest the bottom section 9 is as illustrated of conical configuration and tapers radially outwardly at a slight angle towards the bottom section 9 of the bearing housing 7. The diameter of the outer race 13 is greater than the maximum diameter of the conical outer race 20. The cone angle α of the outer race 20 is selectively dimensioned so that the cylindrical rollers are uniformly loaded over their entire length with a full moment of rotation load of the universal joint and corresponding elastic displacement of the fork leg 1 of the fork joints.

The cylindrical rollers 11 adjacent the rollers 10 on the open axial end of the bearing bushing 7 are disposed in the thin walled portion 8b of the sleeve section 8 and run on a radially elastic outer race 13 of cylindrical configuration. In this manner, when the fork eye 2 is misaligned in relation to the trunnion 6, the cylindrical rollers 11 are not subjected to unpermissibly large end pressures since the sleeve section 8 is only partly supported in the fork eye 2 in the area of the outer race 13. The sleeve portion 8a of the sleeve section can therefore yield elastically in the direction of radial load, that is in a direction acting perpendicularly to the plane of the drawing in FIG. 2.

The cylindrical rollers 10 are laterally guided in the present instance by an elastically compressible seal ring 22 made of rubber or the like which is mounted between the bottom section 9 of the bearing bushing 7 and the axial end faces of the cylindrical rollers 10 facing the bottom section 9. A supporting disc 23 secured, for example, by screws to the fork leg 1 laterally supports or holds the cylindrical roller bearing 17 in place in the fork eye 2. Note that in the present embodiment the axial length of outer race 20 is greater than the axial length of the rollers 10 and the axial length of the rollers 11 is substantially the same as the axial length of the outer race 13.

There is illustrated in FIG. 3 a further modified cylindrical roller bearing 24 in accordance with the present invention. This assembly has parts which are common to the previous assemblies described above and thus are designated by the same reference numerals. Accordingly, the assembly comprises a bearing bushing 7 with a sleeve section 8 and a bottom section 9 axially supporting the trunnion 6 and which closes off the sleeve section on one side. The sleeve section 8 also has a constant diameter over the entire width of its outer peripheral surface 17 and has outer races 12 and 13 formed therein which are offset or stepped radially inwardly to the bottom section 9.

In the present instance, the inner race 25 of the row of cylindrical rollers 10 nearest the bottom section 9 of the bearing bushing 7 is of conical configuration and is slightly tapered radially outwardly toward the bottom section 9 at a cone angle α. The inner races 15 and 25 are located adjacent one another on the trunnion 6 without offset and are of the same diameter.

A friction bearing disc 26 is mounted in the bottom section 9 and confronts the inside wall thereof. This bearing disc serves as a guide for the front face of the trunnion 6 as well as the inner axial end faces 21 of the cylindrical rollers 10. The sleeve section 8 is rigidly supported on the side of the bottom section 9, that is, in the area of the outer race 12 over its entire periphery in the fork eye 2. On the side opposite the bottom section, that is, in the area of the outer race 13, the sleeve section is supported elastically over its entire periphery by an elastically compressible intermediate bushing member 27 made of plastic or the like which seats between the bore or inner wall of the joint eye 2 and the outer peripheral surface 17 of the bearing bushing 7.

With a full moment of rotation at the universal joint, the two fork eyes of each of the two fork joints can be somewhat displaced as a result of the elasticity of the fork leg 1 in the direction of the moment of rotational forces. The corresponding misalignment of the trunnion 6 of the cross link is not harmful since the cylindrical rollers 10 uniformly bear over their entire length and the elastic outer race 13 of the cylindrical rollers 11 can adjust to this angular deviation without overloading the cylindrical rollers 11.

While particular embodiments of the present invention have been illustrated and described herein, it is not intended to limit the invention and changes and modifications may be made therein within the scope of the following claims. For example, more than two rows of cylindrical rollers may be utilized in the bearing bushing and each outer race of the cylindrical rollers may be offset or stepped radially inwardly towards the bottom section bore of the sleeve section. Furthermore while the preferred method of making the bearing bushing in an economical fashion is to produce it in a deep drawing and/or pressure shaping process from metal tape, it may also be made from annular blanks in a cutting process.

Other specific modifications are also possible within the scope of the present invention. Thus, instead of the intermediate bushing 27 characteristic of the FIG. 3 embodiment, an elastic "tolerance ring", in the nature of a corrugated spring plate tape may be inserted between the wall of the joint eye 2 and the outer peripheral surface 17 of the bearing bushing 7. Additionally, radial recesses in the fork eye of the fork joint may also be applied in the area of the periphery only where radial forces are transmitted, that is, in the radial load direction so that the sleeve section is exclusively in this area radially unsupported. These recesses may be filled with elastically compressible material such as plastic or the like which transmits a part of the radial forces of the outer race to the wall of the fork eye and is at the same time effective in damping vibrations.

What is claimed is:

1. Support means for trunnions in fork eyes of universal joints having a cylindrical bore comprising a bearing bushing mounted in the cylindrical bore and consisting of a generally cylindrical sleeve section and a bottom section closing one axial end of said sleeve section adapted to axially support the trunnion, a plurality of cylindrical rollers having axial end faces arranged in at least two side by side rows in an annular space between said sleeve section and trunnion, said trunnion having an outer peripheral surface defining the inner raceways for the rows of rollers, said sleeve section having a constant uniform outer diameter and having stepped outer races formed in its bore section offset in steps radially inwardly towards said bottom section thereby to define a relatively thick walled sleeve section for a first row of rollers adjacent the bottom section and a relatively thin walled sleeve section for the rollers of a second row which are greater in diameter than said rollers of said first row, said sleeve section under the outer races being supported non-elastically at its outer peripheral surface adjacent the bottom section over its entire periphery and being supported elastically on its side opposite the bottom section at least in a radial load direction in the fork eye by means of an intermediate bushing member made of an elastically compressible material which seats between the inner wall of the bore of the fork eye and the outer peripheral surface of the bearing bushing and overlies said second row of rollers.

2. Support means as claimed in claim 1 wherein said intermediate bushing member is made of plastic.

3. Support means as claimed in claim 1 wherein the inner race for the row of cylindrical rollers disposed adjacent the bottom section of the bearing bushing is of conical configuration and tapers slightly radially inwardly toward said bottom section.

4. Support means as claimed in claim 1 wherein the outer race for the row of cylindrical rollers disposed adjacent the bottom section is of conical configuration and tapers slightly radially outwardly towards the bottom section.

5. Support means as claimed in claim 1 including a friction bearing disc mounted in the bottom section serving as a guide for the trunnion and the axial end faces of said first row of rollers.

6. Support means as claimed in claim 1 wherein the rollers of said first row are laterally guided by an elastically compressible seal ring mounted between the bottom section of the bearing bushing and the axial end faces of the rollers of said first row.

7. Support means as claimed in claim 1 wherein the bearing bushing is formed without finishing in a deep drawing process.

8. Support means as claimed in claim 1 wherein the bearing bushing is formed without finishing in a pressure shaping process.

* * * * *